Sept. 16, 1924.

A. E. SONESSON 1,508,481

METAL BELT

Filed Aug. 18, 1923.     3 Sheets-Sheet 1

INVENTOR:
August Erland Sonesson
By Richards & Geier
Attys

Sept. 16, 1924.　　　　　A. E. SONESSON　　　　1,508,481
METAL BELT
Filed Aug. 18, 1923　　　3 Sheets-Sheet 2
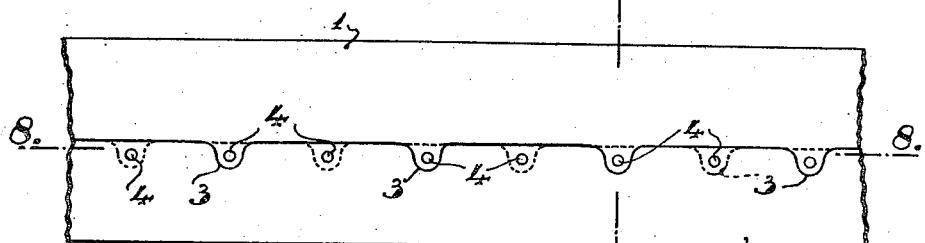
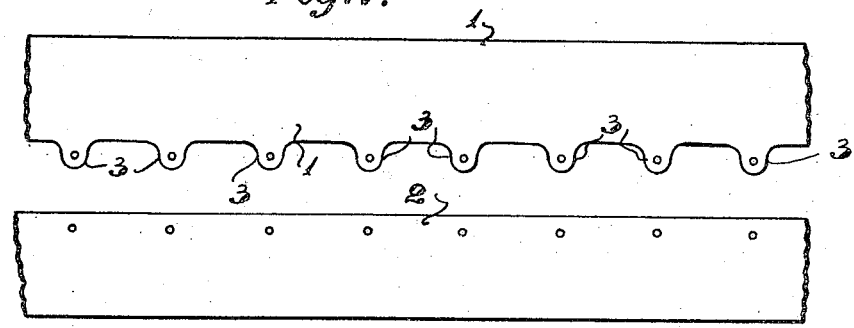
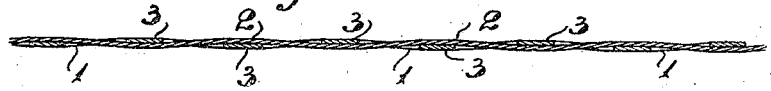
INVENTOR:
August Erland Sonesson
By Richards & Geier
Attys

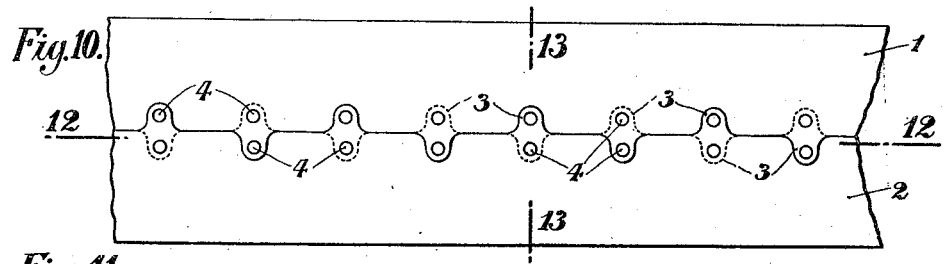
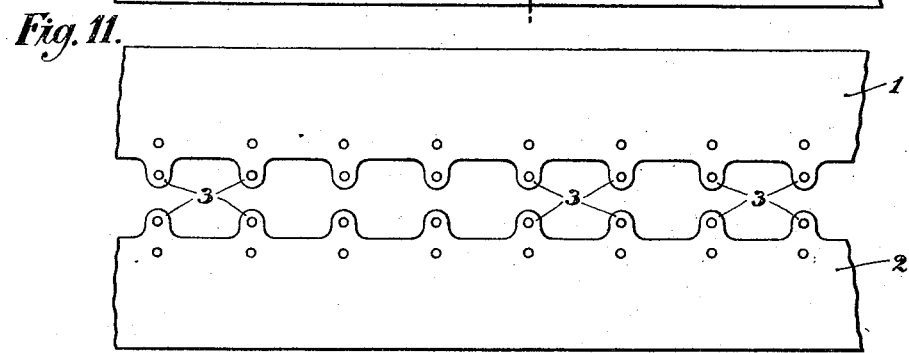
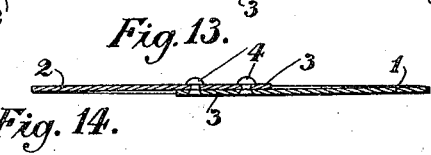
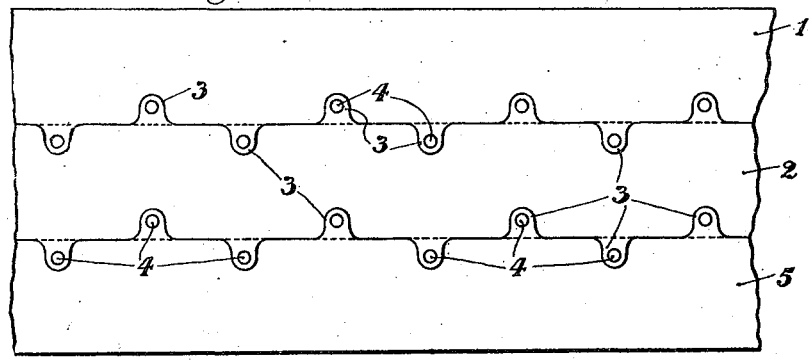

Patented Sept. 16, 1924.

1,508,481

UNITED STATES PATENT OFFICE.

AUGUST ERLAND SONESSON, OF BIRMINGHAM, ENGLAND.

METAL BELT.

Application filed August 18, 1923. Serial No. 658,096.

*To all whom it may concern:*

Be it known that AUGUST ERLAND SONESSON, subject of the King of Sweden, residing at Birmingham, England, has invented certain new and useful Improvements in Metal Belts, of which the following is a specification.

This invention relates to steel and other metal belts for conveying or for other purposes. Flexible rolled steel belts are now extensively used for conveying purposes in place of textile, chain, link and like belts, but owing to difficulties in manufacture the width of such belts is limited. There is, however, a great demand for a wide belt, and the object of the present invention is to provide means whereby a wide steel or metal belt may be produced by longitudinally joining together two or more narrower belts, so that a belt of any desired width may thus be obtained.

It is not possible to produce a satisfactory wide belt merely by overlapping the adjacent longitudinal edges of two belts and riveting them together, as by this means the flexibility necessary to enable the belt to pass round the terminal drums or the like would be greatly reduced and the stress thereby set up would damage the joint.

By joining together two or more belts in accordance with the present invention a wide belt may be produced whose flexibility is not appreciably less than that of a single belt.

According to the said invention at one or both edges of one or more of the belts to be joined, outwardly projecting parts or tongues are provided which are arranged to overlap and to be secured to the adjacent belt or belts, such that portions of each component belt alternately overlap and are overlapped by portions of the adjacent component belt, thereby giving a wave formation to the opposed edges of the belts.

Figure 1 of the accompanying drawings shows a view of the upper or outer face of a portion of a metal belt formed by longitudinally joining together two narrower belts in accordance with this invention.

Figure 6 illustrates a modified arrangement in which projecting portions are provided at the edge of one of the two narrow belts only, the figure showing the two belts connected together.

Figure 7 shows the two belts, constructed in accordance with this modified arrangement, before being connected together.

Figure 8 is a longitudinal section on the line 8—8, Figure 6.

Figure 9 is a cross-section on the line 9—9, Figure 6.

Figure 10 illustrates another method of longitudinally joining together the two narrow component belts.

Figure 11 shows the said belts before being joined together.

Figure 12 is a longitudinal section on the line 12—12, Figure 10.

Figure 13 is a cross-section on the line 13—13, Figure 10.

Figure 14 is a view of three narrow belts longitudinally joined together in accordance with this invention.

The same reference numerals indicate corresponding parts in each of the figures.

Figure 1:
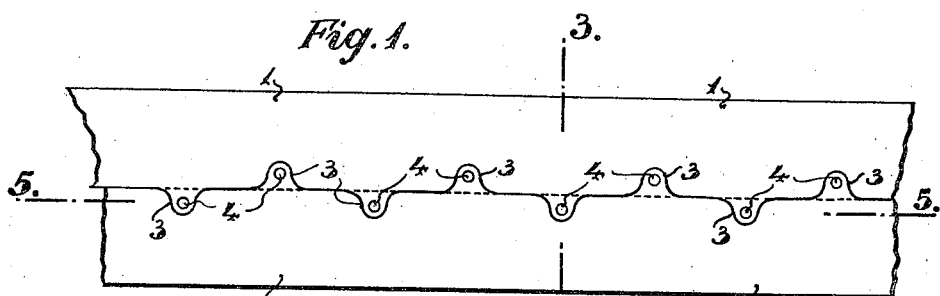
Figure 2:
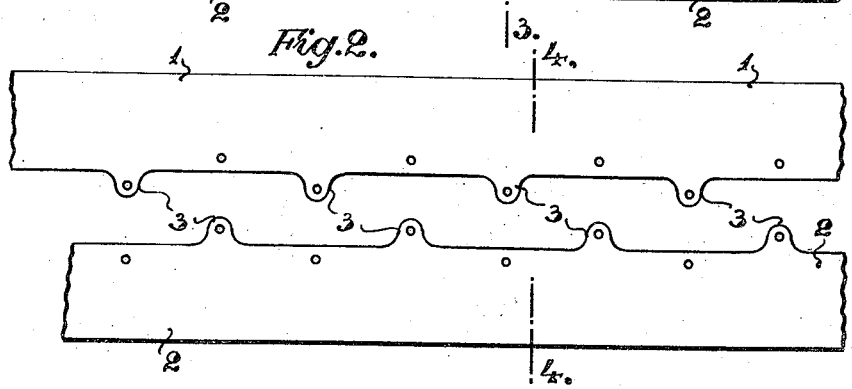
Figure 2 shows the two narrow component belts before being connected together.
Figure 3:
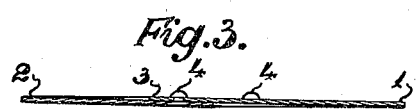
Figure 3 is a cross-section on the line 3—3, Figure 1.
Figure 4:
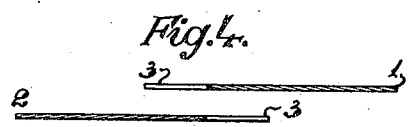
Figure 4 represents a cross-section on line 4—4 Figure 2, through the two component belts before being secured together.
Figure 5:
Figure 5 is a longitudinal section on the line 5—5 Figure 1.

Referring to Figures 1 to 5 of the drawings, the improved steel or other metal belt is formed by longitudinally joining together two narrower belts 1 and 2 respectively. For this purpose the adjacent longitudinal edges of the said belts 1 and 2 are provided with separated integral tongues or ears 3 projecting outwards from the respective edges, and suitably spaced apart in the direction of the length of the belt, as shown in Figure 2. The tongues or ears 3 on the one belt are staggered with respect to those on the adjacent belt so as to come midway between each adjacent pair of tongues upon the latter and the belts 1 and 2 are joined to one another by bringing their longitudinal edges together so that the tongues or ears 3 upon each belt overlap and lie over the corresponding upper face or surface of the adjacent belt, the said tongues or ears 3 being then fixed to the belt which they overlap by rivets 4, suitable holes being provided in the two belts for this purpose. With the above-described arrangement the whole of the tongues or ears 3 are situated upon the upper side of the complete belt; and a wide belt is produced the flexibility of which is not appreciably impaired.

In the arrangement shown in Figures 6 to 9, the belts 1 and 2 are longitudinally connected together by tongues or ears 3 provided at the adjacent edge of the belt 1 only, the opposed edge of the other belt 2 being plain without tongues or ears. The edges of the two belts are brought together and the tongues or ears 3 on the belt 1 are made to overlap the plain edge of the adjacent belt 2 so as to come alternately upon opposite faces of the latter, one tongue lying upon the upper face and the next tongue extending over the lower face, in which position they are fixed by rivets 4.

In another arrangement, as shown in Figures 10 to 13, the opposed edges of both belts 1 and 2 are provided with separated tongues or ears 3 and the tongues upon the edge of the belt 1 brought opposite to the tongues upon the edge of the adjacent belt 2. The two belts are then placed together so that the tongues 3 on each belt overlap the adjacent belt alternately upon opposite faces of the latter at points corresponding to the positions of the tongues carried by the said adjacent belt, so that the adjacent belts 1 and 2 are joined at each of a number of points by two tongues 3, one of which is provided upon each belt, the one tongue being situated upon the top or outer face of the complete belt and the other coming upon the underside thereof, the said tongues upon each face of the complete belt being alternately carried by adjacent belts. The tongues 3 are secured by rivets 4, as previously described.

Any number of belts may be joined together longitudinally by securing tongues or projecting portions on the one belt to the adjacent belt in the manner shown in one or other of the preceding figures. Figure 14 showing three belts secured together in this manner. In the example shown the middle belt 2 is provided with integral tongues 3 along each longitudinal edge, the tongues at the one edge being staggered relatively to the tongues at the other edge, the said tongues 3 upon the two edges of the belt 2 being secured by rivets 4 to the respective outer belts 1 and 5, whilst the opposed edges of the latter are likewise formed with tongues 3 which are secured by rivets to the said middle belt 2. Instead of the tongues on opposite edges of the middle belt being staggered, they may be arranged opposite to one another.

In any of the above arrangements the tongues or projecting portions 3 may be secured to the adjacent belt by riveting, welding, brazing or other suitable means. Where rivets are employed as shown, they may be countersunk and the heads arranged to lie flush on one or both sides of the belt.

Instead of the tongues or ears being integral with the belt by which they are carried they may be formed separately and attached thereto by riveting, welding or other suitable means.

It is obvious that the tongues or ears may be of any suitable shape or pitch; also the main edges of the belts need not necessarily form straight lines but may be curved or bent provided the opposed edge is reversely curved or bent so as to form a close joint.

The invention is applicable not only to steel or metal belts used strictly for conveying purposes, but also to metal belts with or without perforations used for other purposes, such as, for example, for carrying articles for drying, sorting or picking, and like operations.

Having fully described my invention, what I desire to claim and secure by Letters Patent is:—

1. A metal belt including a plurality of component longitudinal belt sections arranged side by side their adjacent longitudinally disposed edges being joined together by means of projecting parts on one edge overlapping and being secured to the other edge, so that portions of each belt section alternately overlap and are overlapped by portions of the adjacent section.

2. A metal belt comprising a plurality of component longitudinal belt sections arranged side by side and having projecting parts at their opposed longitudinal edges, the projecting parts at the edge of one belt section being staggered with reference to the projecting parts at the edge of the adjacent belt section, and the said projecting parts of one belt section overlapping and being secured to the adjacent belt section.

3. A metal belt comprising a plurality of component longitudinal belt sections arranged side by side having projecting parts at their opposed longitudinal edges, the projecting parts at the edge of one belt section being staggered with reference to the projecting parts at the edge of the adjacent belt section, and the said projecting parts of one belt section overlapping and being secured to the adjacent belt section, so that the staggered projecting parts of all the belt sections are disposed upon the same face of the complete belt.

4. A metal belt including a plurality of component longitudinal belt sections arranged side by side, the longitudinal edge of one section having means forming a part of said section and projecting therefrom into overlapping relation to the longitudinal edge of the next adjacent section, and means joining said overlapping means to the latter section to provide a flexible connection between said sections.

In testimony whereof I have hereunto set my hand.

AUGUST ERLAND SONESSON.